United States Patent
Yin et al.

(10) Patent No.: US 11,804,780 B2
(45) Date of Patent: Oct. 31, 2023

(54) MULTI-MODE CONTROL METHOD FOR ACTIVE CLAMP FLYBACK CONVERTER

(71) Applicant: MORNSUN GUANGZHOU SCIENCE & TECHNOLOGY CO., LTD., Guangdong (CN)

(72) Inventors: Xiangyang Yin, Guangdong (CN); Haizhou Wang, Guangdong (CN); Yuan Yuan, Guangdong (CN); Xiang Liu, Guangdong (CN)

(73) Assignee: MORNSUN GUANGZHOU SCIENCE & TECHNOLOGY CO., LTD., Guangdong (CN)

( * ) Notice: Subject to any disclaimer, the term of this patent is extended or adjusted under 35 U.S.C. 154(b) by 310 days.

(21) Appl. No.: 17/434,007

(22) PCT Filed: May 28, 2020

(86) PCT No.: PCT/CN2020/092747
§ 371 (c)(1),
(2) Date: Aug. 26, 2021

(87) PCT Pub. No.: WO2021/057058
PCT Pub. Date: Apr. 1, 2021

(65) Prior Publication Data
US 2022/0140737 A1 May 5, 2022

(30) Foreign Application Priority Data

Sep. 25, 2019 (CN) .......................... 201910909825.8

(51) Int. Cl.
*H02M 3/335* (2006.01)
*H02M 1/00* (2006.01)

(52) U.S. Cl.
CPC ..... *H02M 3/33569* (2013.01); *H02M 1/0035* (2021.05); *H02M 1/0058* (2021.05)

(58) Field of Classification Search
CPC ............ H02M 3/22; H02M 1/08; H02M 1/36; H02M 3/24; H02M 3/325; H02M 3/335;
(Continued)

(56) References Cited

U.S. PATENT DOCUMENTS 5,430,633 A * 7/1995 Smith ............... H02M 3/33569
363/20
9,991,800 B2 * 6/2018 Hari .................. H02M 3/33507
(Continued)

FOREIGN PATENT DOCUMENTS

CN 101572490 11/2009
CN 104300795 1/2015
(Continued)

OTHER PUBLICATIONS

"International Search Report (Form PCT/ISA/210) of PCT/CN2020/092747", dated Aug. 12, 2020, with English translation thereof, pp. 1-5.

Primary Examiner — Jeffrey A Gblende
(74) Attorney, Agent, or Firm — JCIP GLOBAL INC.

(57) ABSTRACT

This disclosure provides a multi-mode control method for an active clamp flyback converter. In the flyback converter, the controller realizes mode switching between a trailing edge non-complementary mode, a leading edge non-complementary mode, and a leading edge non-complementary Burst mode of two driving signals after comparing a detection feedback voltage with the set mode switching threshold voltages. The disclosure adopts the trailing edge non-complementary mode to reduce a circulating current of the converter, uses the leading edge non-complementary mode to replace the ordinary flyback mode to improve light load efficiency, and uses the leading-edge non-complementary Burst mode at no-load to limit a peak current of a primary side in leading-edge non-complementary Burst mode to
(Continued)

avoid generation of audio noise, and allowing a low no-load power consumption.

6 Claims, 5 Drawing Sheets

(58) Field of Classification Search
CPC ...... H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; Y02B 70/1491

See application file for complete search history.

(56) References Cited

U.S. PATENT DOCUMENTS

| | | | |
|---|---|---|---|
| 10,243,469 | B1 | 3/2019 | Liu et al. |
| 10,326,372 | B2 * | 6/2019 | Wang ..................... H02M 1/08 |

FOREIGN PATENT DOCUMENTS

| | | |
|---|---|---|
| CN | 106100352 | 11/2016 |
| CN | 108075664 | 5/2018 |
| CN | 108933533 | 12/2018 |
| CN | 110649817 | 1/2020 |
| JP | 2001275350 | 10/2001 |

\* cited by examiner

MULTI-MODE CONTROL METHOD FOR ACTIVE CLAMP FLYBACK CONVERTER

CROSS-REFERENCE TO RELATED APPLICATION

This application is a 371 of international application of PCT application serial no. PCT/CN2020/092747, filed on May 28, 2020, which claims the priority benefit of China application no. 201910909825.8, filed on Sep. 25, 2019. The entirety of each of the above mentioned patent applications is hereby incorporated by reference herein and made a part of this specification.

BACKGROUND

Technical Field

This disclosure relates to a control method for a flyback converter, in particular to a multi-mode control method for an active clamp flyback converter.

Description of Related Art

A flyback converter is widely used in small and medium power switching power supplies due to its low cost and simple topology. In an actual working process, due to the presence of leakage inductance, the flyback converter is unable to transfer all energy of a primary side to a secondary side. The leakage inductance energy left on the primary side and a junction capacitor of a MOS transistor resonate to cause a drain of a main switch transistor to generate high-frequency voltage spikes. In order to reduce voltage stress of the switch transistor during fabrication of a product, adding a suitable absorption circuit is a common method. Some common absorption circuits include RCD absorption circuit, LCD absorption circuit, and active clamp circuit. An additional clamp switch transistor and a larger clamp capacitor are added in the active clamp circuit, which can save the leakage inductance energy and recover this energy to an input end of the converter. In addition, due to electrical inertia of the leakage inductance, the active clamp circuit extracts a charge on the junction capacitor of a drain of the main switch transistor through a reverse excitation current after the recovery process of the leakage inductance energy is completed, so that the drain voltage of the main switch transistor is reduced to zero, thereby realizing a zero voltage switching-on (ZVS) of the main switch transistor, reducing the switching-on loss of the main switch transistor, and further improving power density of the product.

Figure 1:
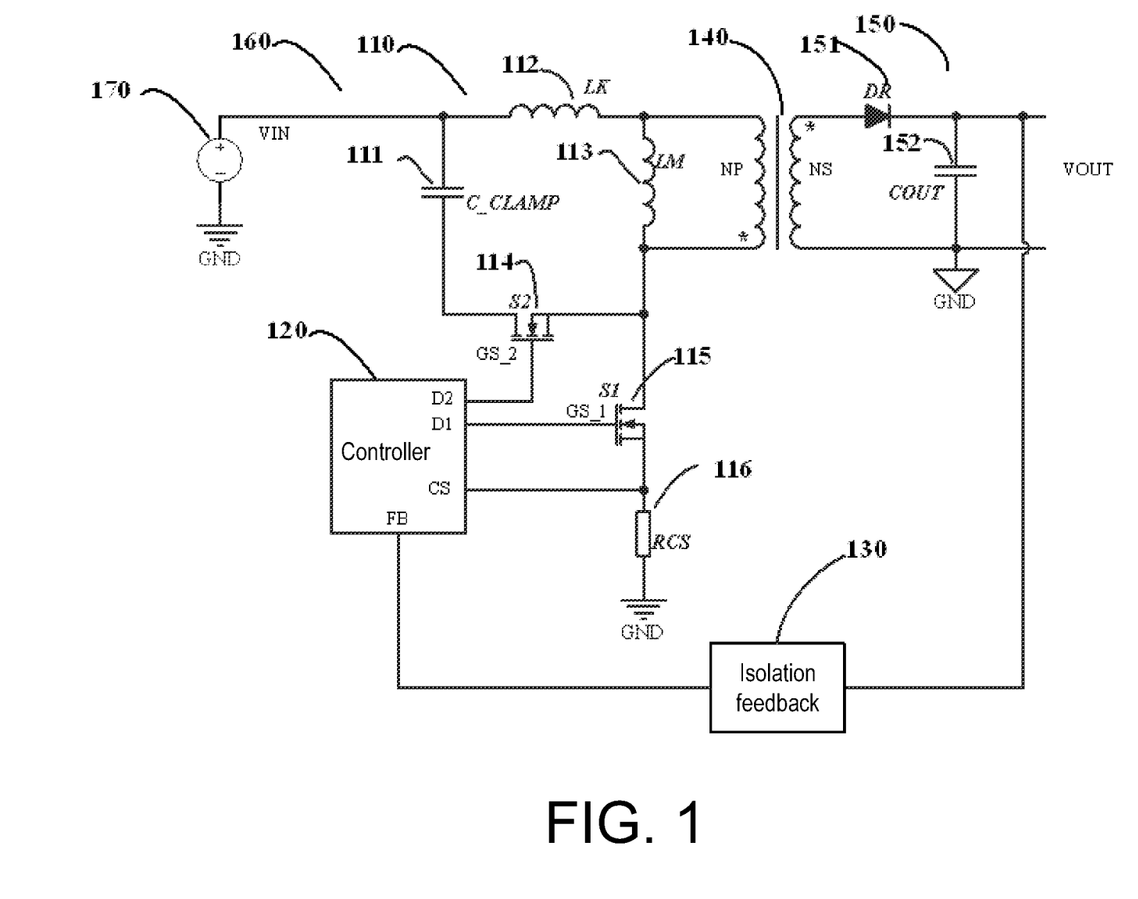
FIG. 1 is a principle block diagram of an existing typical ACF circuit.

FIG. 1 is a circuit diagram of a typical active clamp flyback converter. In the drawing, LK is a leakage inductor, LM is a magnetizing inductor, C_CLAMP is a clamp capacitor, S2 is a clamp switch transistor, S1 is a main switch transistor, $C_{OSS}$ is a main switch junction capacitor, RCS is excitation inductance current sampling resistor, NP is a number of turns of primary winding of a transformer, NS is a number of turns of secondary winding of the transformer, DR is a rectifier diode, $C_{OUT}$ is an output capacitor of the converter, a unit 120 is a controller of the converter (that is, a main control chip of the converter), and a unit 130 is an isolated feedback circuit. The main control chip implements a dual-loop peak current mode control by sampling an output voltage of the flyback converter and a voltage drop on the current sampling resistor RCS through the isolation feedback unit 130, and determines when the main switch transistor S1 is switched on and switched off. In order to realize the ZVS switching-on of the main switch transistor S1, it is necessary to reasonably control a switch-on time of the clamp switch transistor S2. In fact, it is difficult to pull a voltage of a switch node to ground potential only by relying on the leakage inductor, instead, inductance of the magnetizing inductor LM has to be appropriately reduced, so that the magnetizing inductor also has a negative current. After the clamp switch transistor is switched off, a negative current still flows through the magnetizing inductor and the leakage inductor, extracting energy from the switch junction capacitor, so that the voltage of the switch node is pulled to the ground potential.

Figure 2:
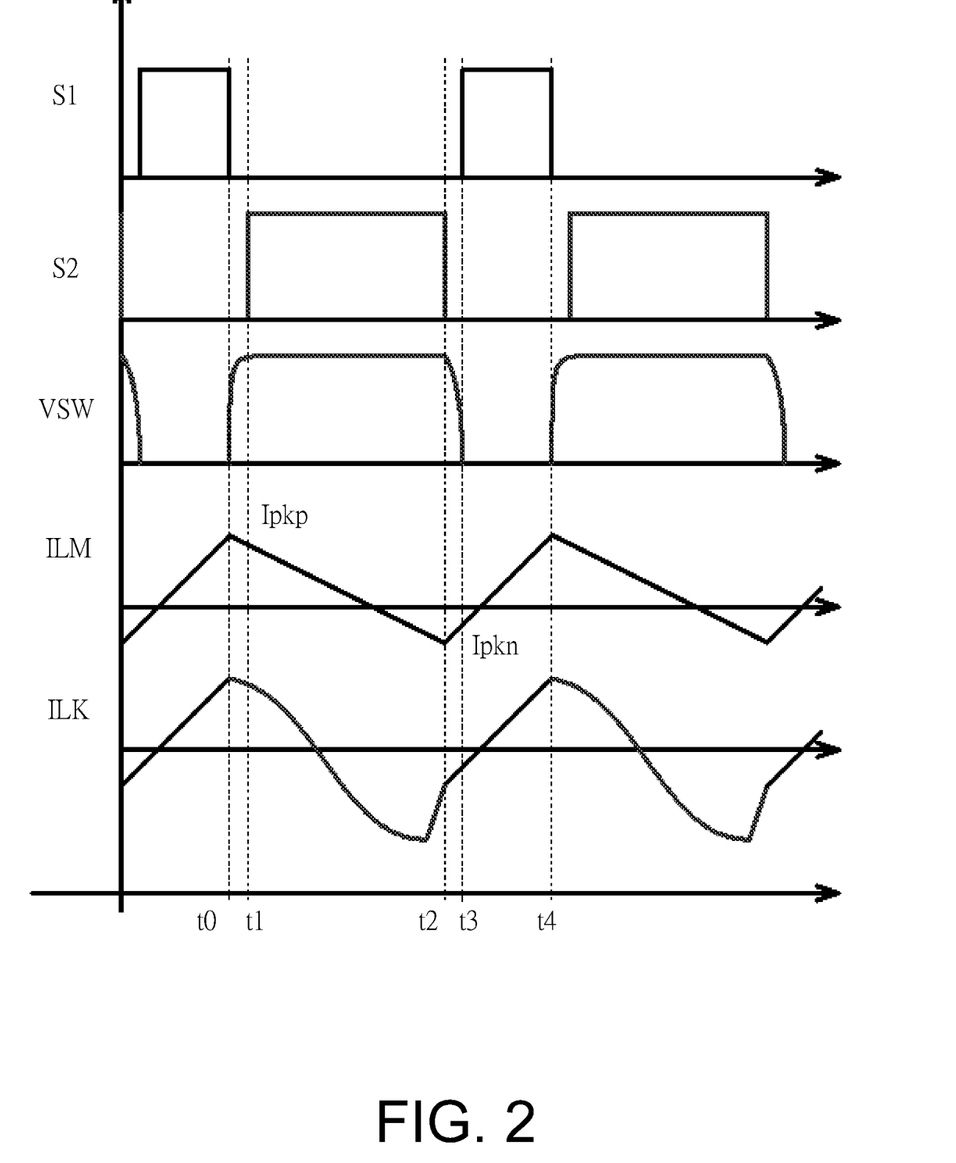
FIG. 2 is a waveform diagram of key signals of an active clamp flyback converter in an existing typical complementary mode control method.

FIG. 2 is a key waveform diagram of a typical complementary mode active clamp flyback converter shown in FIG. 1 working in the complementary mode.

The following is a principle analysis of FIG. 2 according to different time points. S1 is a drive waveform of the gate of the main switch transistor, S2 is a drive waveform of the gate of the clamp switch transistor, VSW is a voltage waveform of the drain of the main switch transistor, and ILM is a waveform of the excitation inductance current, and ILK is a waveform of the leakage inductance current.

Stage 1 ($t_0$ to $t_1$): At a time to, a driving signal S1 of a switch transistor 115 is switched from a high level to a low level, and the switch transistor 115 is switched off. A voltage on an output junction capacitor between the drain and the source of the switch transistor 115 rises rapidly to $V_{in}+nV_{out}$ after the switch transistor 115 is switched off. An inductor 113 begins to transfer energy to a secondary side through the transformer 140, and an inductor 112 begins to resonate with a capacitor 111 through a body diode of a switch transistor 114 until $t_1$.

Stage 2 ($t_1$ to $t_2$): At the time $t_1$, a driving signal S2 of the switch transistor 114 switches from a low level to a high level, and the switch transistor 114 is switched on. The inductor 113 continues to resonate with the capacitor 111 through the switch transistor 114 until $t_2$ after the switch transistor 114 is switched on. At this stage, a primary side continues to transfer energy to the secondary side.

Stage 3 ($t_2$ to $t_3$): At a time $t_2$, the driving signal S2 of the switch transistor 114 is switched from the high level to the low level, and the switch transistor 114 is switched off. A resonance current at this time is equal to an excitation current after the switch transistor 114 is switched off, therefore the primary side stops transferring the energy to the secondary side in this stage, and a voltage across two ends of the primary winding of the transformer is no longer clamped by the secondary side. At this time, due to the presence of the negative excitation current on the inductor 113, the current extracts the charge from the output junction capacitor of the drain and the source of the switch transistor 115, thereby realizing the zero voltage switching-on of the switch transistor 115 in the next cycle.

Stage 4 ($t_3$ to $t_4$): At a time $t_3$, the driving signal S1 of the switch transistor 115 is switched from the low level to the high level, and the switch transistor 115 is switched on. The inductor 113 converts electric energy obtained from an input voltage source 170 into magnetic energy and stores it, and a primary excitation current rises linearly until a time $t_4$.

Assume that an inductance amount of the magnetizing inductor is $L_M$, an inductance amount of the leakage inductor is $L_K$, a positive peak value of the magnetizing inductor current is $I_{PKP}$ and a negative peak value is $I_{PKN}$, the voltage of the drain of the main switch transistor is $V_{SW}$, and a parasitic capacitance value of the switch node is $C_{OSS}$. In order to reliably ZVS switch on of the main switch transistor, the above power level parameters have to fulfil:

$½·L_M·I_{PKN}^2 > ½·C_{OSS}·V_{SW}^2$, where the $L_M$ and the $C_{OSS}$ is fixed. It may be seen from the formula that to realize the ZVS of the main switch transistor, a certain magnitude of the negative inductance current must be ensured, and as the input voltage increases, the negative current required is increased. When an output load is reduced, the peak value of the positive inductance current begins to decrease, therefore an on-time of the main switch transistor and an on-time of the clamp switch transistor should be reduced accordingly, so as to ensure that the peak value of the negative excitation current is a constant value. Therefore, a switching frequency of the complementary mode active clamp flyback converter increases as the load decreases, and a switching loss and a driving loss of the switch transistor do not decrease when the output load is decreased. In addition, there is still a large circulating energy in a clamp switch transistor path in the complementary mode at light load, which also reduces light-load efficiency.

U.S. Pat. No. 9,991,800B2 provides a multi-mode control active clamp flyback controller. This patent realizes switching between a complementary mode, a normal flyback and a Burst mode by detecting a voltage of a feedback pin FB. However, the complementary mode has an advantage at a power level of above 45 W, because if the power is too small, the circulating current is still very large when working in the complementary mode, which causes the converter to have no advantage at low power levels. In addition, as the load decreases, the switching frequency in the complementary mode is increased, which causes a large jump in an operating frequency when the mode is switched, causing loop instability and poor electromagnetic interference (EMI) characteristics. When working at light load in the traditional flyback discontinuous (DCM) mode, the energy stored on the clamp capacitor may only be consumed by connecting to a large resistor in parallel, therefore the light-load efficiency is not high.

U.S. Ser. No. 10/243,469B1 provides a Burst mode control method. The control method works in a normal flyback Burst mode when the load is less than 20%. In this mode, the energy stored on the clamp capacitor may only be consumed by connecting to a large resistor in parallel. It also works in the complementary mode when there is a full load, therefore it is only suitable for products with higher power levels.

Patent CN101572490A proposes a non-complementary control method. Although the control method may reduce frequency as the load decreases, there is still a negative current, thereby causing the converter to have a large circulating current and low load efficiency. At the same time, the presence of the negative current makes the peak current of the primary side to be relatively large, thereby causing relatively large no-load power consumption and audible noise.

SUMMARY

In view of the above, this disclosure provides a multi-mode control method for an active clamp flyback converter, which is mainly used for low power level power supplies. The method may not only ensure realization of ZVS of a main switch transistor, improvement of light-load efficiency and low no-load power consumption, it may also further reduce frequency at light load and ensure there is no sudden frequency changes during multi-mode conversion concurrently.

The disclosure provides a multi-mode control method for an active clamp flyback converter. In the flyback converter, a main switch transistor controls a magnitude of a current of a primary winding of a flyback transformer, a clamp switch transistor clamps a node voltage on a primary side of the flyback transformer, and a controller generates two driving signals for controlling the main switch transistor and the clamp switch transistor through detection of a feedback voltage at an output end of the flyback converter. The controller realizes mode switching between a trailing edge non-complementary mode, a leading edge non-complementary mode, and a leading edge non-complementary Burst mode of the two driving signals after comparing the detection feedback voltage with set mode switching threshold voltages. Mode switching threshold voltages are respectively a first threshold voltage $V_{ATD}$ for a transition from the trailing edge non-complementary mode to the leading edge non-complementary mode, a second threshold voltage $V_{DTA}$ for a transition from the leading edge non-complementary mode to the trailing edge non-complementary mode, and a third threshold voltage $V_{Burst}$ of the leading edge non-complementary Burst mode.

The converter works in the trailing edge non-complementary mode when the feedback voltage is greater than the second threshold voltage $V_{DTA}$. The converter works in the leading edge non-complementary mode when the feedback voltage is smaller than the first threshold voltage $V_{ATD}$. A working mode of a previous work cycle is maintained when the feedback voltage is between the first threshold voltage $V_{ATD}$ and the second threshold voltage $V_{DTA}$. The converter works in the leading edge non-complementary Burst mode when the feedback voltage is smaller than the third threshold voltage $V_{Burst}$. The first threshold voltage $V_{ATD}$ is smaller than the second threshold voltage $V_{DTA}$, and the third threshold voltage $V_{Burst}$ is smaller than the first threshold voltage $V_{ATD}$, and the three threshold voltages are designed independent of each other.

Operating frequencies of the above main switch transistor and the clamp switch transistor are the same, but on-time of the two switch transistors is different. The on-time of the main switch transistor is obtained by comparing a peak current sampling voltage of the primary side and the feedback voltage. The on-time of the clamp transistor varies according to different working modes. The on-time of the clamp transistor should enable the main switch transistor to just realize a ZVS turn-on when working in the trailing edge non-complementary mode. The on-time of the clamp transistor is fixed when working in the leading-edge non-complementary mode.

The circulating current of the converter is reduced by using the trailing edge non-complementary mode. The leading edge non-complementary mode is used to replace an ordinary flyback mode to improve the light-load efficiency. The leading edge non-complementary Burst mode is used at no-load to limit a peak current of the primary side in the leading edge non-complementary Burst mode, so as to prevent generation of audio noise and allow low no-load power consumption, while eliminating a need for a clamp circuit to connect to a large resistor in parallel so as to consume energy on a clamp capacitor at no load.

Because setting of the threshold voltages at different power levels are different, the controller has two pins for setting the first threshold voltage $V_{ATD}$ and the second threshold voltage $V_{DTA}$. The first threshold voltage $V_{ATD}$ and the second threshold voltage $V_{DTA}$ are set between 5% and 20% of the feedback voltage corresponding to a load, and a resistance value of a resistor corresponding to the pin may be changed according to different requirements. The third threshold voltage $V_{Burst}$ is set between 2% and 4% of the feedback voltage corresponding to a load.

Furthermore, a frequency reduction fourth threshold voltage $V_f$ is further set. The switching frequency of the main switch transistor decreases from a maximum frequency as the feedback voltage decreases when the feedback voltage is smaller than the frequency reduction fourth threshold voltage $V_f$. The switching frequency of the main switch transistor fluctuates by 5% above and below the maximum switching frequency when the feedback voltage is greater than the frequency reduction fourth threshold voltage $V_f$.

Preferably, the frequency reduction fourth threshold voltage $V_f$ is set between 60% and 70% of the feedback voltage corresponding to a load.

Preferably, the converter is controlled to work in the leading edge non-complementary Burst mode when the feedback voltage is smaller than the third threshold voltage $V_{Brust}$. The leading edge non-complementary Burst mode controls a peak current of the primary winding to a fixed value. The driving signals of the main switch transistor and the clamp switch transistor are switched off concurrently when the feedback voltage is smaller than a fifth threshold voltage $V_{Brust\_L}$. The driving signals of the main switch transistor and the clamp switch transistor are outputted normally when the feedback voltage is greater than a sixth threshold voltage $V_{Brust\_H}$.

The fifth threshold voltage $V_{Brust\_L}$ and the sixth threshold voltage $V_{Brust\_H}$ are values set internally by the controller 120, the fifth threshold voltage $V_{Brust\_L}$ and the sixth threshold voltage $V_{Brust\_H}$ are smaller than the third threshold voltage $V_{Brust}$, and there is a 0.5V difference between the two.

Compared to the related art, some advantages of the multi-mode power supply control method of the disclosure are as follows.
1. The circulating current of the converter at heavy load is small, as the on-time of the clamp transistor is different according to the different working modes, therefore the on-time of the clamp transistor is adaptive, and the on-time of the clamp transistor under different input voltages is different.
2. The mode switching does not affect stability of a loop. The converter works at a lighter load when the mode is switched. At this time, the energy on the clamp capacitor is small, which does not cause output to overshoot or undershoot, therefore not affecting the stability of the loop.
3. At the light load, the energy on the clamp capacitor is recovered through the leading-edge non-complementary mode, and there is no need to connect to a large resistor in parallel.
4. High light-load efficiency is realized because leakage inductance energy is not consumed by the resistor, and is instead transferred to a secondary side to load.
5. Low no-load power consumption is realized because the leakage inductance energy is not consumed by the resistor, and is instead transmitted to the secondary side to load.

DESCRIPTION OF THE EMBODIMENTS

In an embodiment, a multi-mode flyback power supply includes an active clamp flyback converter and a controller. The active clamp flyback converter is for adjusting an input voltage and outputting a desired voltage. The active clamp flyback converter includes a main switch transistor that controls a magnitude of a current of a primary winding of a flyback transformer, and a clamp switch transistor that clamps a node voltage on a primary side of the flyback transformer. The controller generates control signals for controlling the main switch transistor and the clamp switch transistor through a detection of a feedback voltage. The multi-mode flyback power supply may drive work in existing combinations of a trailing edge non-complementary mode, a leading edge non-complementary mode, and a leading edge non-complementary Burst mode. Switching frequencies of the trailing edge non-complementary mode and the leading edge non-complementary mode change with a change in the feedback voltage.

Figure 4:
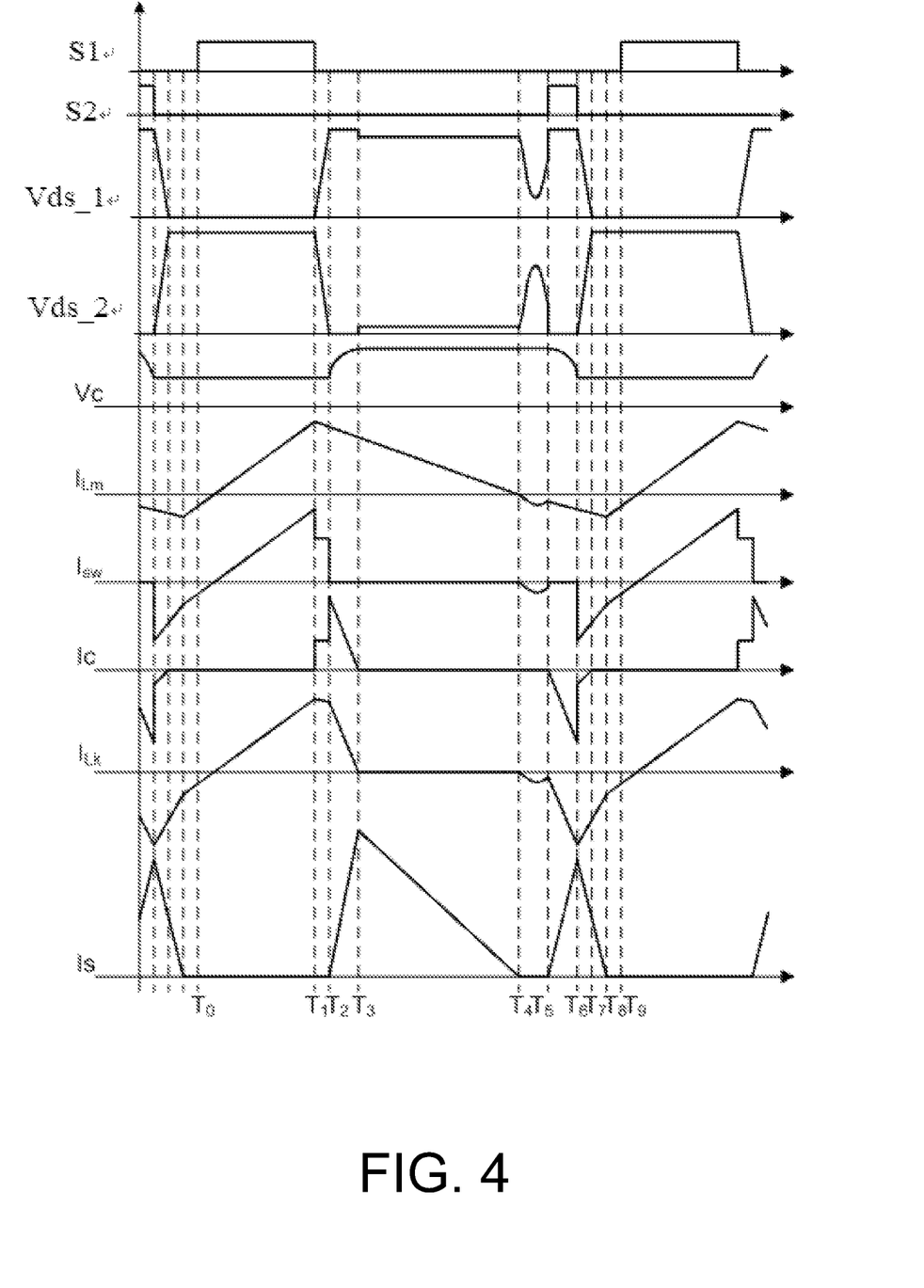
FIG. 4 is a key waveform diagram of the trailing edge non-complementary mode of the multi-mode power control method of the disclosure.
Figure 5:
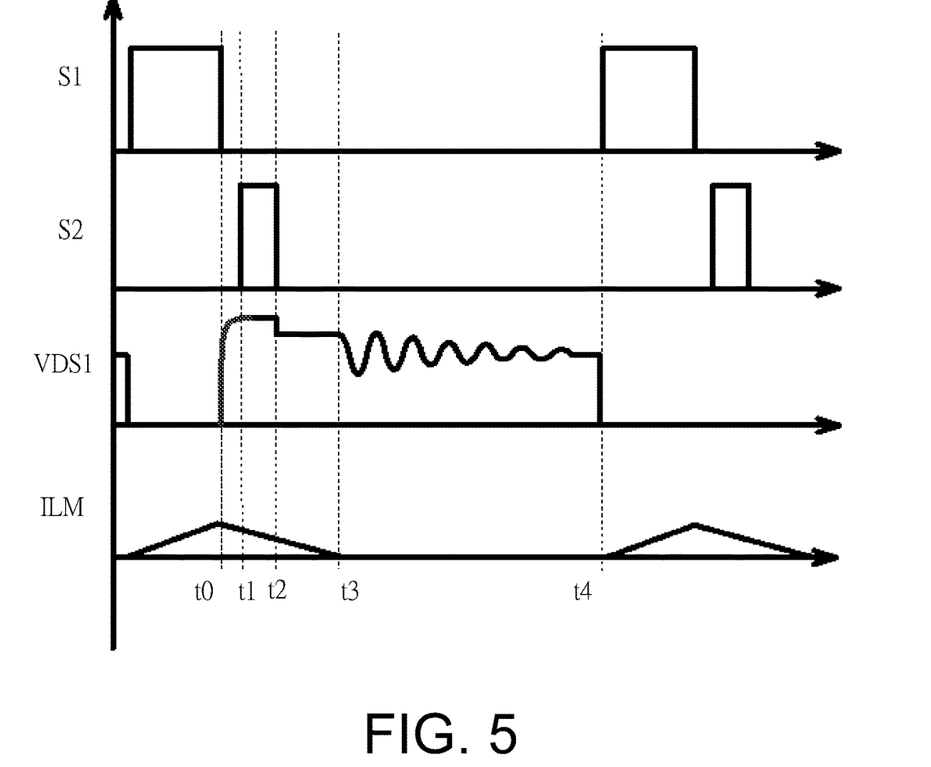
FIG. 5 is a key waveform diagram of the leading edge non-complementary mode of the multi-mode power control method of the disclosure.
Figure 6:
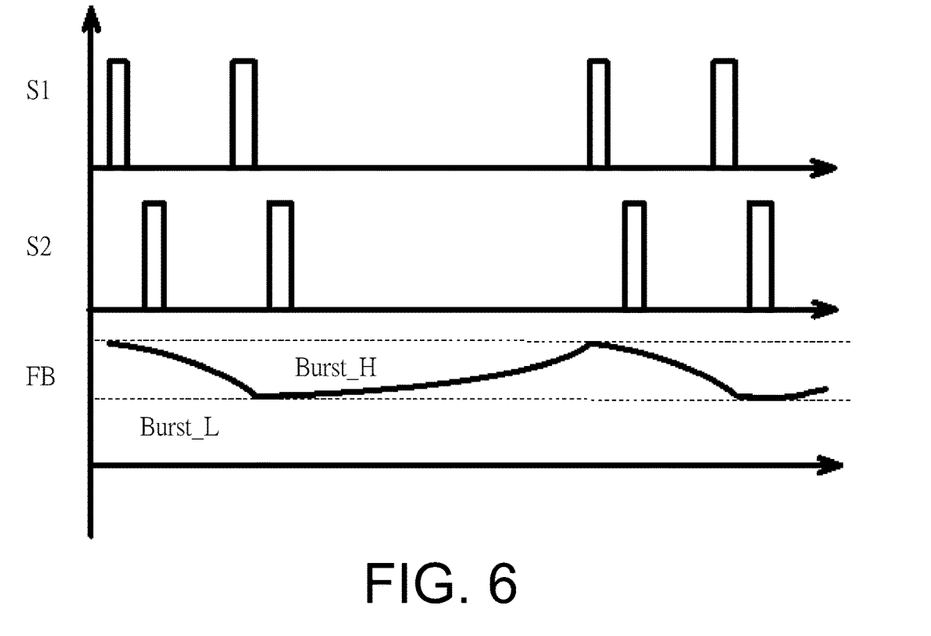
FIG. 6 is a key waveform diagram of the leading edge non-complementary Burst mode when the multi-mode power supply control method of the disclosure is at no-load.

The trailing edge non-complementary mode means that the main switch transistor is switched on immediately after a dead time when the clamp switch transistor is switched off. A driving signal sequence is shown in FIG. 4, where S1 is the driving signal of the main switch transistor, and S2 is the driving signal of the clamp switch transistor. The leading edge non-complementary mode means that the clamp switch transistor is switched on for a short period of time after a dead time when the main switch transistor is switched off. A driving signal sequence is shown in FIG. 5, where S1 is the driving signal of the main switch transistor, and S2 is the driving signal of the clamp switch transistor. The leading edge non-complementary Burst mode means that a timing signal between the main switch transistor and the clamp switch transistor is non-complementary at light load or no-load. During actual work, the two groups drive work for a period of time and rest for a period of time, thereby reducing equivalent frequency. A driving signal sequence is shown in FIG. 6, where S1 is the driving signal of the main switch transistor, and S2 is the driving signal of the clamp switch transistor.

FIG. 1 shows in schematic form an active clamp flyback power supply according to some embodiments. It includes an active clamp flyback (ACF) converter 160 and a controller 120 for adjusting an input voltage of a voltage source 170 and outputting a desired output voltage.

The ACF converter 160 includes a primary side circuit 110, a flyback transformer 140, and a secondary side circuit 150. Both primary winding and secondary winding of the flyback transformer 140 have a same-named end and a different-named end, and a magnetic core is coupled with the primary winding and the secondary winding.

The primary side circuit 110 includes a clamp capacitor 111, a leakage inductor 112, an excitation inductor 113, a clamp switch transistor 114, a main switch transistor 115, and a sampling resistor 116. A first terminal of the capacitor 111 is connected to an output terminal of the input voltage source 170. A first terminal of the inductor 112 is connected to the output terminal of the input voltage source 170, and a second terminal of the inductor 112 is connected to the different-named end of the primary winding of the flyback transformer 140. A first terminal of the inductor 113 is connected to the different-named end of the primary winding of the flyback transformer 140, and a second terminal of the inductor 113 is connected to the same-named end of the primary winding of the flyback transformer 140. A drain of the switch transistor 114 is connected to a second terminal of the capacitor 111, and a source of the switch transistor 114 is connected to the same-named end of the primary winding of the flyback transformer 140. A drain of the switch transistor 115 is connected to the same-named end of the primary winding of the flyback transformer 140, and a source of the switch transistor 115 is connected to a first terminal of the resistor 116. A second terminal of the resistor 116 is connected to ground. The switch transistors 114 and 115 are both N-channel metal oxide semiconductor (MOS) transistors.

The secondary circuit 150 includes an output rectifier diode 151 and an output capacitor 152. An anode of the output rectifier diode 151 is connected to the same-named end of the secondary winding of the flyback transformer, and a cathode of the output rectifier diode 151 is connected to a first terminal of the output capacitor 152. A second terminal of the output capacitor 152 is connected to the ground. In some embodiments, the rectifier diode may also be replaced by an N-channel metal oxide semiconductor (MOS) transistor.

The controller 120 includes a feedback signal input port FB that is connected to a second port of an isolation feedback 130, a second output port D2 that is connected to a gate of the switch transistor 114 for providing a driving signal to it, and a first output port D1 that is connected to a gate of the switch transistor 115 for providing a driving signal to it. As shown in FIG. 1, the controller 120 is realized as an integrated circuit, and other elements of the multi-mode power supply are discrete elements. In other embodiments, some discrete devices may also be integrated into the integrated circuit.

During actual work, the controller 120 controls switching actions of the switch transistors 115 and 114 through driving signals GS_1 and GS_2 sent by the ports D1 and D2, which is for controlling the ACF converter 160 to adjust the output voltage to a preset value. The isolated feedback circuit provides a feedback signal FB to the controller 120. The controller 120 compares the FB signal with a preset reference voltage, and a result of the comparison changes a duty cycle of the switch transistors 114 and 115, thereby adjusting the output voltage to a desired value.

Figure 3:
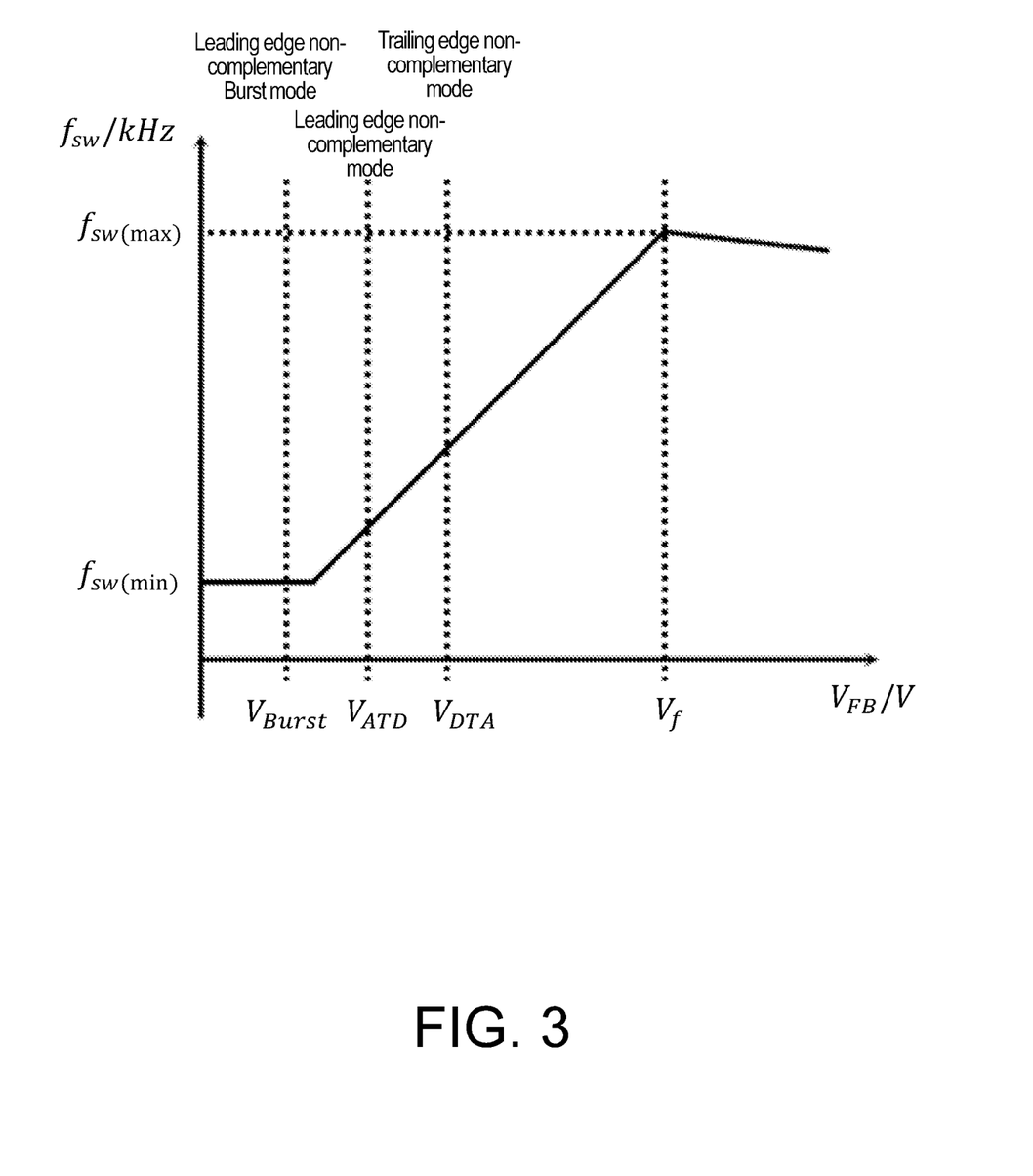
FIG. 3 shows a relationship between operating frequency and mode switching of a multi-mode power supply control method of the disclosure and load.

FIG. 3 shows a diagram form of a mode switching process of the flyback converter in FIG. 1 in the existing combinations of the trailing edge non-complementary mode, the leading edge non-complementary mode, and the leading edge non-complementary Burst mode. In FIG. 3, horizontal coordinates represent the FB signal in volts, and vertical coordinates represent a switching frequency in kilohertz (KHz). A switching frequency of the main switch transistor is basically unchanged, and may fluctuate by 5% above and below a maximum switching frequency when the feedback voltage is greater than a frequency reduction fourth threshold voltage $V_f$. A switching frequency of the ACF converter decreases proportionally with a decrease of the feedback voltage until the switching frequency reaches a preset clamping frequency point $f_{sw(min)}$ when the feedback voltage is smaller than the frequency reduction fourth threshold voltage $V_f$, so as to prevent the ACF converter 160 from generating audible noise. The ACF converter works in the trailing edge non-complementary active clamp flyback mode when the feedback voltage is greater than a second threshold voltage $V_{DTA}$. The ACF converter works in the leading edge non-complementary active clamp flyback mode when the feedback voltage is smaller than a first threshold voltage $V_{ATD}$. The converter maintains a working mode of a previous work cycle when the feedback voltage is between the first threshold voltage $V_{ATD}$ and the second threshold voltage $V_{DTA}$. The converter works in the leading edge non-complementary Burst mode when the feedback voltage is smaller than a third threshold voltage $V_{Burst}$.

The first threshold voltage $V_{ATD}$ is smaller than the second threshold voltage $V_{DTA}$, and the third threshold voltage $V_{Burst}$ is smaller than the first threshold voltage $V_{ATD}$, and the three threshold voltages are designed independent of each other. The first threshold voltage $V_{ATD}$ and the second threshold voltage $V_{DTA}$ are set between 5% and 20% of the feedback voltage corresponding to a load. The third threshold voltage $V_{Burst}$ is set between 2% and 4% of the feedback voltage corresponding to a load. The fourth threshold voltage is set between 60% and 70% of the feedback voltage corresponding to a load.

FIG. 4 is a key waveform diagram of the trailing edge non-complementary mode of the multi-mode power supply of the disclosure. The following is an analysis of a trailing edge non-complementary working principle.

First stage [T0 to T1]: At a time T0, the main switch transistor S1 is switched on, and a primary current flows through a magnetizing inductor and the S1 and increases linearly. At a time T1, the S1 is switched off and the First stage ends.

Second stage [T1 to T2]: At the time T1, the S1 is switched off, a primary excitation current charges an output capacitor of the S1, while an output capacitor of the S2 discharges, and a voltage on the clamp capacitor remains unchanged. A secondary side rectifier diode has two possible states, depending on a difference between a capacitance voltage VC of the clamp capacitor and a drain-source voltage Vds_1 of the main switch transistor S1. When $$\frac{V_C - V_{ds\_1}}{N \cdot V_0} > \frac{L_m + L_k}{L_m},$$

the diode is switched on. Otherwise, the diode is switched off. When Vds_1=0, this stage ends.

Third stage [T2 to T3]: After Vds_1 drops to zero, a body diode of the clamp switch transistor S2 is switched on. The secondary side rectifier diode is switched on, and a voltage across two ends of a primary side magnetizing inductor is clamped at −NVO (negative N times of the output voltage). A leakage inductor Lk and the clamp capacitor resonate.

Fourth stage [T3 to T4]: At a time T3, a leakage inductance current drops to zero, and the clamp switch transistor S2 is switched off. The secondary side rectifier diode remains switched on, the voltage across the two ends of the primary side magnetizing inductor is still clamped at −NVO, and the drain-source voltage of the main switch transistor S1 drops to Vin+NVO.

Fifth stage [T4 to T5]: At a time T4, a secondary side rectifier diode current naturally crosses zero, the clamp voltage of the primary side magnetizing inductor disappears, and the magnetizing inductor resonates with output junction capacitors of the main switch transistor S1 and the clamp switch transistor S2. At a time T5, the clamp switch transistor S2 is switched on, and this stage ends.

Sixth stage [T5 to T6]: At a time T5, the clamp switch transistor S2 is switched on, a voltage across two ends of the magnetizing inductor and the leakage inductor is clamped at −VC, and the drain-source voltage of the main switch transistor S1 rises to Vin+VC. The secondary side rectifier diode remains switched on, and the voltage across the two ends of the magnetizing inductor is still clamped at −NVO, therefore a voltage across two ends of the leakage inductor is clamped at NVO−VC, the leakage inductor is reversely excited, and the leakage inductance current resonantly rises. At a time T6, the clamp switch transistor S2 is switched off, and this stage ends.

Seventh stage [T6 to T7]: At the time T6, the clamp switch transistor S2 is switched off, and a leakage current discharges the output capacitor of the main switch transistor S1, and concurrently charges the output capacitor of the clamp switch transistor S2, while the clamp capacitor voltage VC remains unchanged. When Vds_1 drops to zero, this stage ends.

Eighth stage [T7 to T8]: When Vds_1 drops to zero, the body diode of the main switch transistor S1 is switched on. The voltage across the two ends of the leakage inductor Lk is NVO-Vin, and a leakage inductance reverse current decreases linearly. The main switch transistor S1 has to be turned on before the leakage inductance current reverses again, otherwise zero voltage switching-on will not be realized.

Ninth stage [T8 to T9]: At a time T8, the leakage current rises to the excitation current, iLk(t8)=iLm(t8), a primary current of an ideal transformer drops to zero, and the secondary rectifier diode current crosses zero. The voltage across the two ends of the leakage inductor and the magnetizing inductor is Vin, and the leakage inductance current and a magnetizing current maintain a consistent linear rise.

FIG. 5 is a key waveform diagram of the leading edge non-complementary mode of the multi-mode power supply of the disclosure. The following is an analysis of a leading edge non-complementary working principle.

Stage 1 ($t_0$ to $t_1$): At a time to, a main switch transistor driving signal S1 is switched from a high level to a low level, the primary excitation current charges the output junction capacitor of the main switch transistor, and the leakage inductor and the clamp capacitor discharge the clamp capacitor through a resonance current of the body diode of the clamp switch transistor. When the voltage on the junction capacitor of the main switch transistor rises to above $V_{in}+nV_{out}$, the voltage across the two ends of the drain and source of the clamp switch transistor drops to zero, and the transformer begins to transfer energy to the secondary side.

Stage 2 ($t_1$ to $t_2$): At a time $t_1$, as the voltage across the two ends of the clamp switch transistor drops to zero, the clamp switch transistor realizes the zero-voltage switching-on, the leakage inductor and the clamp capacitor resonate through the clamp switch transistor, and the resonance current charges the clamp capacitor. Energy stored on the leakage inductor is transferred to the clamp capacitor for storage, while the transformer continues to transfer energy to the secondary side at this time.

Stage 3 ($t_2$ to $t_3$): At a time $t_2$, the clamp switch transistor is switched off, the excitation current does not drop to zero and continues to transfer energy to the secondary side until the excitation current becomes zero.

Stage 4 ($t_3$ to $t_4$): At a time $t_3$, the excitation current is zero, the primary side no longer transfers energy to the secondary side, and the voltage across two ends of the transformer winding is zero. At this time, the leakage inductor and an excitation inductor of the transformer resonate with the output junction capacitor of the main switch transistor until the main switch transistor is switched on at a time $t_4$, and enters a next cycle.

FIG. 6 is a key waveform diagram of the leading edge non-complementary Burst mode of the disclosure at no-load. When the load is at no-load, the converter works in the leading edge non-complementary Burst mode. Entering the leading edge non-complementary Burst mode is realized by detecting the feedback voltage.

When the feedback voltage is greater than a high threshold voltage $V_{Burst\_H}$ (the sixth threshold voltage) of the leading edge non-complementary Burst mode, the controller outputs leading edge pulse signals of the main switch transistor and the clamp switch transistor.

When the feedback voltage is smaller than a low threshold voltage $V_{Burst\_L}$ (the fifth threshold voltage) of the leading edge non-complementary Burst mode, the controller switches off the leading edge pulse signals of the main switch transistor and the clamp switch transistor.

When the feedback voltage is greater than low threshold voltage $V_{Burst\_L}$ of the leading edge non-complementary Burst mode, but smaller than the high threshold voltage $V_{Burst\_H}$ of the leading edge non-complementary Burst mode, the controller controls the driving signals of the main switch transistor and the clamp switch transistor to maintain a same state as a previous cycle, and then finally saving a currently sampling feedback voltage.

The embodiments of the disclosure are not limited thereto. According to the above content, the multi-mode flyback power supply control method of the disclosure has other implementation means as known to those skilled in common technical knowledge and conventional means of the field, without departing from the spirit and scope of disclosure. Therefore, the disclosure may be modified, replaced or changed in various other forms, all of which fall within the protection scope of the disclosure.

What is claimed is:

1. A multi-mode control method for an active clamp flyback converter, wherein the flyback converter comprises a main switch transistor that controls a magnitude of a current of a primary winding of a flyback transformer, a clamp switch transistor that clamps a node voltage on a primary side of the flyback transformer, and a controller that generates two driving signals for controlling the main switch transistor and the clamp switch transistor through detection of a feedback voltage at an output end of the flyback converter; the method comprising: mode switching between a trailing edge non-complementary mode, a leading edge non-complementary mode, and a leading edge non-complementary burst mode of the two driving signals after comparing the detection feedback voltage with set mode switching threshold voltages by the controller; wherein set mode switching threshold voltages are respectively a first threshold voltage ($V_{ATD}$) for a transition from the trailing edge non-complementary mode to the leading edge non-complementary mode, a second threshold voltage ($V_{DTA}$) for a transition from the leading edge non-complementary mode to the trailing edge non-complementary mode, and a third threshold voltage ($V_{Burst}$) for a transition to the leading edge non-complementary burst mode;

wherein the converter works in the trailing edge non-complementary mode when the feedback voltage is greater than the second threshold voltage ($V_{DTA}$); the converter works in the leading edge non-complementary mode when the feedback voltage is smaller than the first threshold voltage ($V_{ATD}$); a working mode of a previous work cycle is maintained when the feedback voltage is between the first threshold voltage ($V_{ATD}$) and the second threshold voltage ($V_{DTA}$); and the converter works in the leading edge non-complementary burst mode when the feedback voltage is smaller than the third threshold voltage ($V_{Burst}$), wherein the first threshold voltage ($V_{ATD}$) is smaller than the second threshold voltage ($V_{DTA}$), the third threshold voltage ($V_{Burst}$) is smaller than the first threshold voltage ($V_{ATD}$), and the first, second, and third threshold voltages are independent of each other.

2. The multi-mode control method for the active clamp flyback converter according to claim 1, wherein the first threshold voltage ($V_{ATD}$) and the second threshold voltage ($V_{DAT}$) are set between 5% and 20% of the feedback voltage corresponding to a load; and the third threshold voltage ($V_{Burst}$) is set between 2% and 4% of the feedback voltage corresponding to the load.

3. The multi-mode control method for the active clamp flyback converter according to claim 1, comprising: setting a frequency reduction fourth threshold voltage ($V_f$), wherein a switching frequency of the main switch transistor decreases from a maximum frequency as the feedback voltage decreases when the feedback voltage is smaller than the frequency reduction fourth threshold voltage ($V_f$); and the switching frequency of the main switch transistor fluctuates by 5% above and below a maximum switching frequency when the feedback voltage is greater than the frequency reduction fourth threshold voltage ($V_f$).

4. The multi-mode control method for the active clamp flyback converter according to claim 3, wherein the frequency reduction fourth threshold voltage ($V_f$) is set at between 60% and 70% of the feedback voltage corresponding to a load.

5. The multi-mode control method for the active clamp flyback converter according to claim 1, wherein the converter is controlled to work in the leading edge non-complementary burst mode when the feedback voltage is smaller than the third threshold voltage ($V_{Burst}$), and the leading edge non-complementary burst mode controls a peak current of the primary winding to a fixed value, the driving signals of the main switch transistor and the clamp switch transistor are switched off concurrently when the feedback voltage is smaller than a fifth threshold voltage ($V_{Burst\_L}$), and the driving signals of the main switch transistor and the clamp switch transistor are not switched off concurrently when the feedback voltage is greater than a sixth threshold voltage ($V_{Burst\_H}$), wherein the fifth threshold voltage ($V_{Burst\_L}$) and the sixth threshold voltage ($V_{Burst\_H}$) are smaller than the third threshold voltage ($V_{Burst}$).

6. The multi-mode control method for the active clamp flyback converter according to claim 5, wherein a difference between the fifth threshold voltage ($V_{Burst\_L}$) and the sixth threshold voltage ($V_{Burst\_H}$) is 0.5V.

* * * * *